United States Patent
Beadles et al.

(10) Patent No.: US 7,284,042 B2
(45) Date of Patent: Oct. 16, 2007

(54) DEVICE PLUG-IN SYSTEM FOR CONFIGURING NETWORK DEVICE OVER A PUBLIC NETWORK

(75) Inventors: Mark A. Beadles, Hilliard, OH (US); William S. Emerick, Dublin, OH (US); Kevin A. Russo, Lewis Center, OH (US); Kenneth E. Mulh, Upper Arlington, OH (US); Raymond J. Bell, Mill Valley, CA (US)

(73) Assignee: Endforce, Inc., Dublin, OH (US)

( * ) Notice: Subject to any disclaimer, the term of this patent is extended or adjusted under 35 U.S.C. 154(b) by 532 days.

(21) Appl. No.: 10/219,091

(22) Filed: Aug. 13, 2002

(65) Prior Publication Data

US 2003/0037128 A1 Feb. 20, 2003

Related U.S. Application Data

(60) Provisional application No. 60/312,498, filed on Aug. 14, 2001.

(51) Int. Cl.
*G06F 15/177* (2006.01)
(52) U.S. Cl. ........... 709/220; 709/201; 709/214; 709/217; 709/221; 713/1; 713/2; 713/170; 713/171
(58) Field of Classification Search ........ 709/220–222, 709/223, 225–227, 201, 214–216; 370/254; 713/150, 153, 155, 193, 201, 1, 2, 170, 171
See application file for complete search history.

(56) References Cited

U.S. PATENT DOCUMENTS

| | | | |
|---|---|---|---|
| 5,349,643 A * | 9/1994 | Cox et al. .................. 713/155 |
| 5,838,907 A * | 11/1998 | Hansen ....................... 709/220 |
| 5,870,605 A | 2/1999 | Bracho et al. |
| 5,872,928 A | 2/1999 | Lewis et al. |
| 5,987,611 A | 11/1999 | Freund |
| 6,167,445 A | 12/2000 | Gai et al. |
| 6,170,009 B1 * | 1/2001 | Mandal et al. ............... 709/223 |
| 6,327,660 B1 * | 12/2001 | Patel .......................... 713/193 |
| 6,330,560 B1 | 12/2001 | Harrison et al. |
| 6,452,915 B1 | 9/2002 | Jorgensen |
| 6,463,470 B1 | 10/2002 | Mohaban et al. |

(Continued)

OTHER PUBLICATIONS

R. Chaudury et al. Directory Schema Level Administration of Differentiated Services and Integrated Services in Networks, Jun. 28, 1998, pp. 1-20.

(Continued)

*Primary Examiner*—Thu Ha Nguyen
(74) *Attorney, Agent, or Firm*—Townsend and Townsend and Crew

(57) ABSTRACT

The present invention provides device configuration and policy configuration data to network devices over a public network, e.g., the internet. A secure communication link is first established over the public network to the network device. Next, policy and configuration information is downloaded to the network device using that secure communication link. In one embodiment, the communication link is an IPSec tunnel. In particular, the network policy may include a virtual private network (VPN) policy. The invention addresses the secure downloading of configuration and policy information, which has not been an issue in prior art devices where there was an ability to provide such information internally to a network, without the need to go over the internet.

18 Claims, 12 Drawing Sheets

U.S. PATENT DOCUMENTS

| | | |
|---|---|---|
| 6,466,984 B1 | 10/2002 | Naveh et al. |
| 6,505,244 B1 | 1/2003 | Natarajan et al. |
| 6,539,425 B1 * | 3/2003 | Stevens et al. ............. 709/220 |
| 6,539,427 B1 | 3/2003 | Natarajan et al. |
| 6,539,483 B1 * | 3/2003 | Harrison et al. ................ 726/1 |
| 6,577,597 B1 | 6/2003 | Natarajan et al. |
| 6,584,502 B1 | 6/2003 | Natarajan et al. |
| 6,590,885 B1 | 7/2003 | Jorgensen |
| 6,611,863 B1 | 8/2003 | Banginwar |
| 6,725,260 B1 | 4/2004 | Philyaw |
| 6,751,729 B1 * | 6/2004 | Giniger et al. .............. 713/153 |
| 6,771,661 B1 | 8/2004 | Chawla et al. |
| 6,820,121 B1 * | 11/2004 | Callis et al. ................ 709/225 |
| 6,829,250 B2 | 12/2004 | Voit et al. |
| 6,915,436 B1 * | 7/2005 | Booth et al. ................... 726/3 |
| 6,918,039 B1 | 7/2005 | Hind et al. |
| 6,918,084 B1 | 7/2005 | Slaughter et al. |
| 6,922,724 B1 | 7/2005 | Freeman et al. |
| 2003/0107950 A1 | 6/2003 | Craycraft et al. |
| 2003/0163727 A1 * | 8/2003 | Hammons et al. .......... 713/201 |
| 2003/0182431 A1 * | 9/2003 | Sturniolo et al. .......... 709/227 |
| 2004/0030771 A1 | 2/2004 | Strassner et al. |
| 2004/0044891 A1 * | 3/2004 | Hanzlik et al. ............. 713/150 |
| 2005/0132229 A1 * | 6/2005 | Zhang et al. ............... 713/201 |
| 2005/0278523 A1 * | 12/2005 | Fortin et al. .................... 713/1 |

OTHER PUBLICATIONS

Herscovitz, Eli "Secure virtual private networks: the future of data communications", John Wiley and Sons, N.Y. N.Y Jul. 4-Aug. 1999 vol. 9, Issue 4, pp. 213-220.

* cited by examiner

DEVICE PLUG-IN SYSTEM FOR CONFIGURING NETWORK DEVICE OVER A PUBLIC NETWORK

This application is related to application Ser. No. 10/219,096, "Selection and Storage of Policies in Network Management", Ser. No. 10/219,236, "Policy Engine for Modular Generation of Policy for a Flat, Per-Device Database", Ser. No. 10/219,187, "Event Management for a Remote Network Policy Management System" and Ser. No. 10/219,142, "Modular Remote Network Policy Management System", all filed even date herewith and assigned to the same assignee, and all incorporated herein by reference.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to management and control of communication networks and, in particular, to remote configuration of network devices.

Networks

A communication network typically includes a number of network devices that, among other functions, transmit or receive data. A local area network, commonly referred to as a LAN, is a privately owned network that facilitates communication among the devices coupled to the network via one of several data communication protocols such as Ethernet or FDDI. Multiple LANs are typically interconnected via, for example, private links or satellite transmissions to form a wide area network, commonly referred to as a WAN. Such LANs and WANs are increasingly being coupled to the internet.

Communication network systems are becoming ever more complex. To increase resource sharing and facilitate their supervision, computer systems, such as facsimile machines, desktop computers, printers, etc. are typically coupled to a LAN. The complexity that arises as a result of increasing the number and the variety of systems, which in the aggregate form a computer network, coupled with the variety of communication protocols that such devices are required to support, increase the knowledge base that is often required to manage such networks. The problem is further compounded by the increasing complexity of new generation of high performance network devices and their interoperability as well as by the lack of qualified and well-trained network administrators. To operate and conform to a network's objectives, a network device (e.g. a router) is first configured—i.e., the networking parameters of the device are set to desired values. An inventory as well as a record of the configuration parameters of each configured networked device is typically maintained for future reference. Network devices are often reconfigured (e.g., by changing router ports, routing tables, IP addresses) to accommodate for network expansion or modification—for example, to add a new user to the network.

Device Based Network Management

One conventional method of configuring a networked device is to issue commands which are specific to the device via a computer system. A drawback of the method is that each networked device is configured and subsequently verified separately to ensure its conformity with the desired network objectives. Another drawback of the method is that it requires an extensive knowledge base—of the various network device types—which may become prohibitively large as the number of device types in a network rises.

Outsourcing Network Management

Another known method for managing a communications network is through outsourcing the network management to another commercial entity. For example, WorldCom Inc., located at 500 Clinton Center Drive, Clinton Miss., 39056 offers a network management service based on which a group of network administrators at WorldCom, upon receiving specific requests to manage or configure a network device, transmit related commands and data via the internet to the network device thereby to manage or configure the device. The method, however, involves human intervention and is thus inefficient and unautomated.

Policy Based Network Management

A third known method for managing networked devices is to include a number of individual devices of a given type in a policy domain and apply a set of policies to the domain. Such policy-based methods, however, are only applicable to a limited number of specific device types. Furthermore, in such conventional policy-based network communication systems, policies are defined through a descriptive programming language. The applied policies so defined become attributes of their associated devices and are thus not objects which can be pointed to and thus viewed.

In directory-enabled policy-based network management systems, a directory serves as the central location for storing policies, profiles, user information, network configuration data, and internet protocol (IP) infrastructure data, such as network addresses and server information. Policies in directory-enabled networking (DEN) are defined in terms of rules containing conditions and actions for managing users, network resources, and services/applications.

In DEN, physical details of a network are separated from the logical attributes of the application types. DEN has many key attributes and characteristics that typically enable an associated network to be rapidly reconfigured and operate with other platforms. A directory-enabled network is typically scalable, fault-tolerant, and, preferably recognizes people and application by their associated attributes and characteristics and not by their numerical sequences, such as their IP addresses.

Data stored in the directory of a directory-enabled network are typically in formats derived from standard schemas based on the DEN specification published by a group of companies which are collectively known as the Distributed Management Task Force (DMTF). A schema is a collection of rules defining the relationships among objects representing users, applications, network elements, and network services. Each schema contains rules which govern the organization and logical representation of the schema objects.

Access to directory in DEN is commonly governed by version 3 of the known lightweight directory access protocol (LDAPv3), which is a stripped down version of the X.500 directory services standard.

In a directory-enabled network, network entities and the relationship between such network entities are governed by an information system, known in the art as the common information model (CIM). A CIM contains rules regarding management of, for example, hardware, operating systems, operations, application installation and configuration, security, identity, etc. The CIM which is also defined by the DMTF is a standard object-oriented model that represents objects in terms of instances, properties, relationships, classes and subclasses. A primary goal of the CIM is to present a consistent view of managed networks independent of the protocols and data formats supported by the various devices in and applications running on the networks.

One known directory serving as the central storage location in a directory-enabled network is the Windows 2000 Active Directory™, which is developed by and is available from Microsoft Corporation located at One Microsoft Way, Redmond, Wash., 98052. In addition to serving as the cental policy store, Windows 2000 Active Directory™ provides a framework for, among other function, publishing network services, managing users, computer systems, applications and services, as well as secure intranet and internet network services. Furthermore, Windows 2000 Active Directory™ provides a backbone for distributed security in Windows 2000 and a central service point for administrators to manage network services. Windows 2000 Active Directory™, which is an effective platform for DEN, is based on standard protocols such as Domain Name System (DNS)—which is used to locate servers running Active Directory—LDAPv3 (described briefly above) and Kerberos—which is a security protocol for logon authentication.

The Windows 2000 Active Directory™ includes a schema with definitions for every object class that exists in the directory service. Therefore, the universe of objects that may be represented in the Active Directory™ is extensible. Other information related to the Windows 2000 Active Directory™ features and functions are available from Microsoft corporation. The Active Directory supports Component Object Model (COM) features. COM is a language independent standard that promotes object oriented programming by specifying the interfaces of a component at the binary level.

As stated above, conventional methods of configuring and maintaining a communication network are costly, time-consuming and require expert administrators capable of reliably managing and controlling ever more complex network systems in a timely manner.

BRIEF SUMMARY OF THE INVENTION

The present invention provides device configuration and policy configuration data to network devices over a public network, e.g., the internet. A secure communication link is first established over the public network to the network device. Next, policy and configuration information is downloaded to the network device using that secure communication link. In one embodiment, the communication link is an IPSec tunnel. In particular, the network policy may include a virtual private network (VPN) policy. The invention addresses the secure downloading of configuration and policy information, which has not been an issue in prior art devices where there was an ability to provide such information internally to a network, without the need to go over the internet.

In one embodiment, the invention also provides a method for downloading configuration and policy data where the network device doesn't have the capability to establish the secure link. A non-secure, public link is established to the network device, and a boot-strap partial configuration is downloaded to enable the establishment of a secure channel. A secure channel is then established using the partial configuration and the full configuration data is then downloaded. In particular, credentials and a key of the network device are changed after the bootstrap configuration provides a secure link, to further secure the subsequent communications.

In another embodiment, the present invention provides a network management system for transmitting network policy over a public network to network devices. The interface includes a push model interface for pushing network policy configurations onto a network device, in response to an event in the network management system. In addition, the interface also provides a pull model interface which can provide network policy configurations to a network device upon a request from the network device itself. Thus, the present invention uniquely marries the two types of interfaces for a single system.

In another embodiment, the invention provides a device simulator which simulates the command interface to devices controlled by the network management system. Thus, rather than simulating functionality, the interface itself is simulated. The simulator includes event storage and an event reporting system for receiving events from the network management system, storing events in the event storage and providing an event responses to the command interface after a simulated response time.

In one embodiment, the management system is multi-layered, modular and stores device configuration data in non-device specific format, which are subsequently translated to device-specific format by lower layers of the management system. The non-device specific format is the same (e.g., XML) as that used to create the policies with the user GUI (e.g., browser) and transport them to the service center over the internet. A database stores a policy directory in a hierarchical format that is separate from a policy store (configuration store) for devices in a flat (non-hierarchical or parallel) format.

DETAILED DESCRIPTION OF THE INVENTION

A. Overview of the Operational Stages of the System

The present invention provides policy-based outsourced network management system at a service center and thus manages and controls a communication network having multiple network device types over a network (e.g., the internet). The management of a typical communications system by the outsourced management system of the present invention is briefly shown in FIGS. 1A–1F, described below.

Figure 1A:
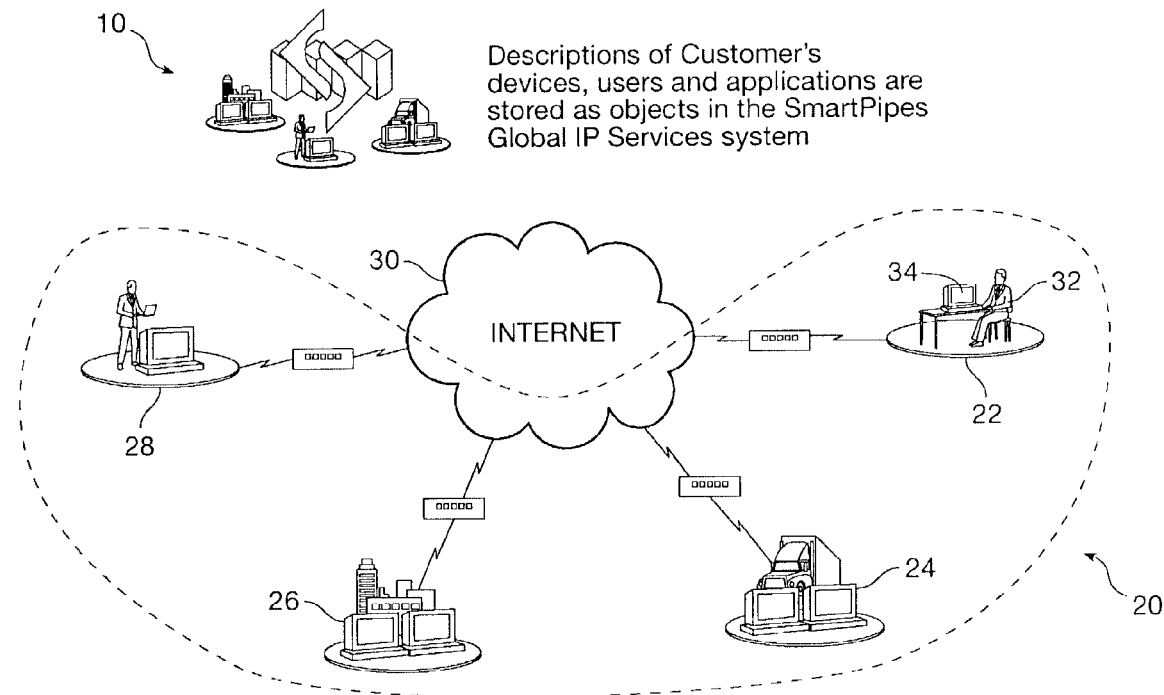
FIGS. 1A–1F show a client network communications system being managed by the policy-based network management system, in accordance with one embodiment of the present invention.

FIG. 1A shows a customer communications network 20 (shown inside the dashed perimeter lines and composed of network service points 22, 24, 26 and 28) that is coupled to the management system 10 via internet 30. Each network service point may include a number of network devices, such as routers, hubs, printers, facsimile machines, computer systems, etc. In FIG. 1A, internet 30 is shown as the communications medium via which customer 32 using his computer system 34 communicates with management system 10. The customer's devices are stored as objects in the management system 10.

Figure 1B:
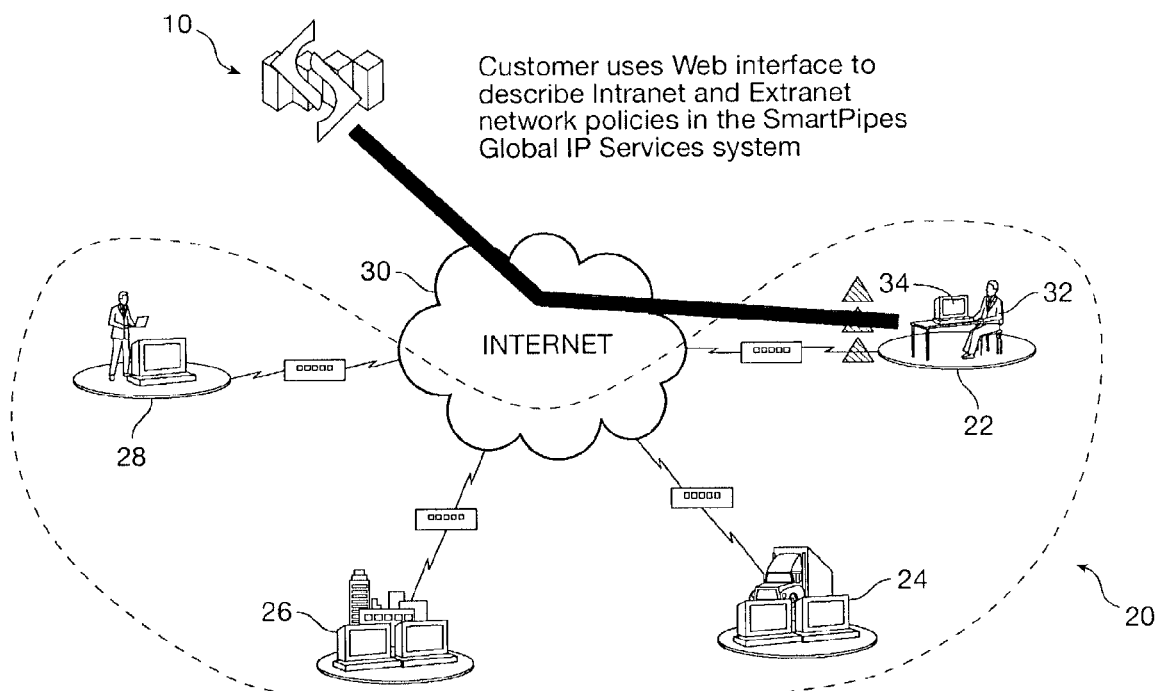

Next, as shown in simplified FIG. 1B, the customer describes intranet and extranet policies for configuring the network communications system 20 under the control and management of system 10. Customer 32 uses a graphical user interface (GUI) on his/her computer system 34, such as an internet browser. The customer describes network policies using the browser, then provides them over the internet to management system 10.

Figure 1C:
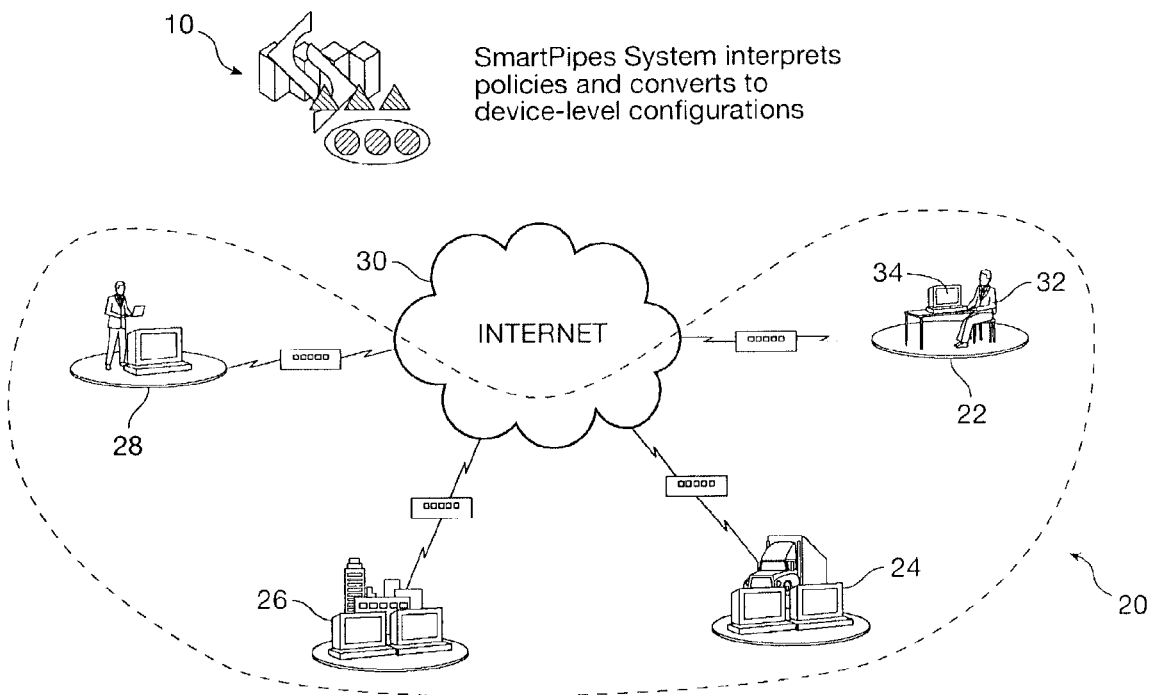

Next, as shown in simplified FIG. 1C, system 10 interprets and converts the selected network policies to device-level configuration data and stores the configuration data in a directory.

Figure 1D:
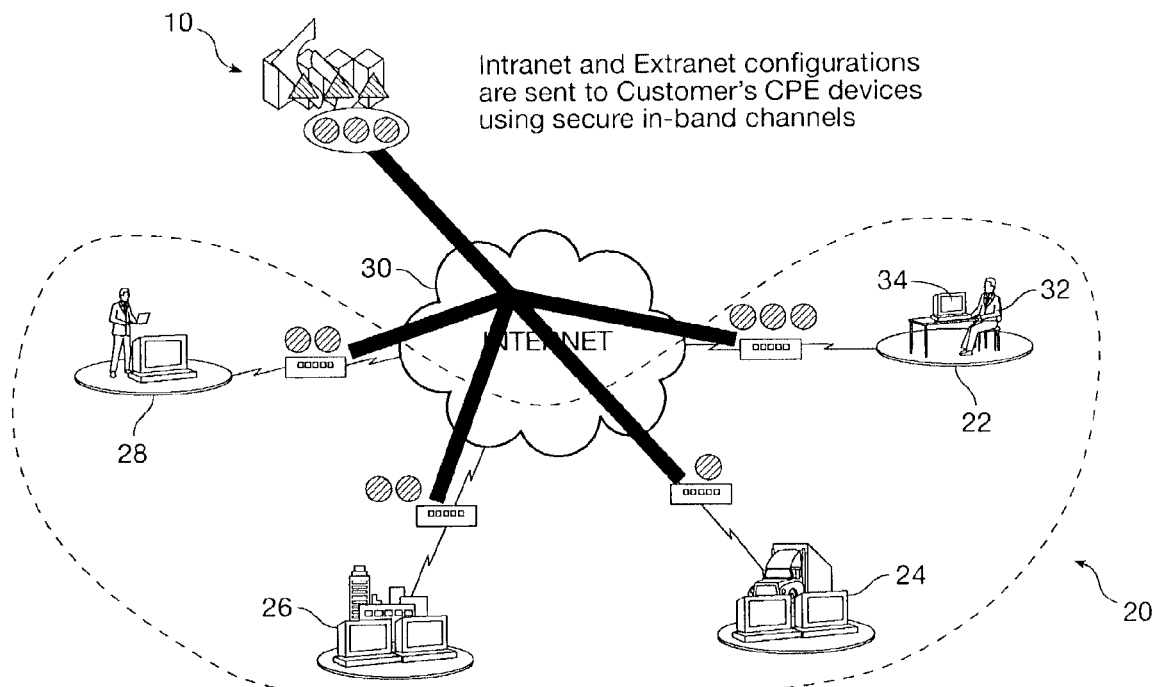

Next, as shown in simplified FIG. 1D, system 10 via the internet 30 and using a secure channel, applies the selected intranet and extranet policies to configure the network devices disposed in each of the network service points 22, 24, 26, and 28 to thereby bring the communication network 20 under its control.

Figure 1E:
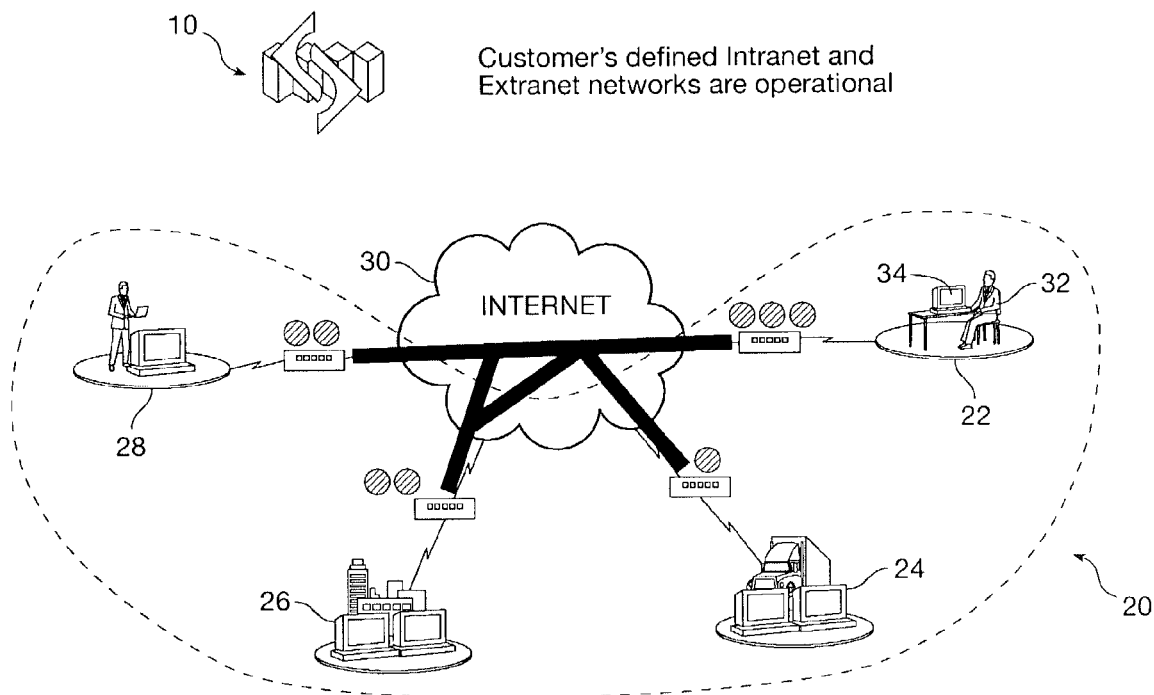

FIG. 1E shows that the system 10 has completed configuration of communications network 20, which therefore may carry out its intranet and extranet policies in accordance with the adopted policies.

Figure 1F:
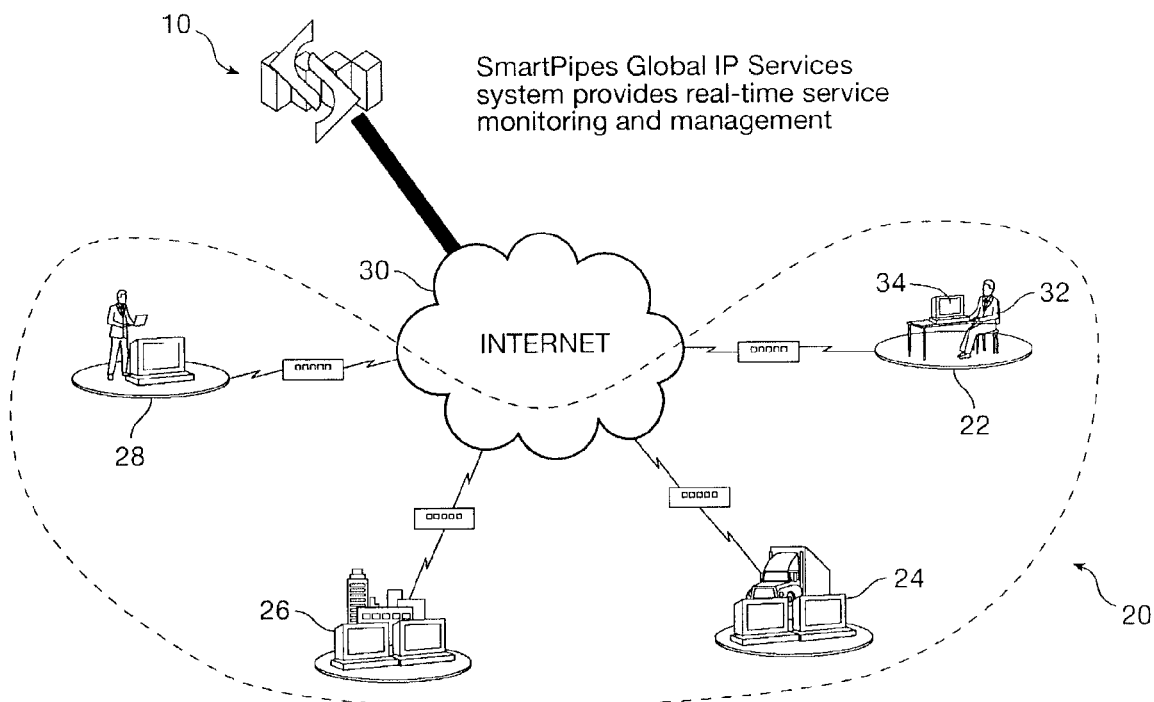

FIG. 1F shows that after configuring the network devices and applying the network policies, system 10 continues to monitor and manage network communications system 20 via internet 30.

B. System Overview

Figure 2A:
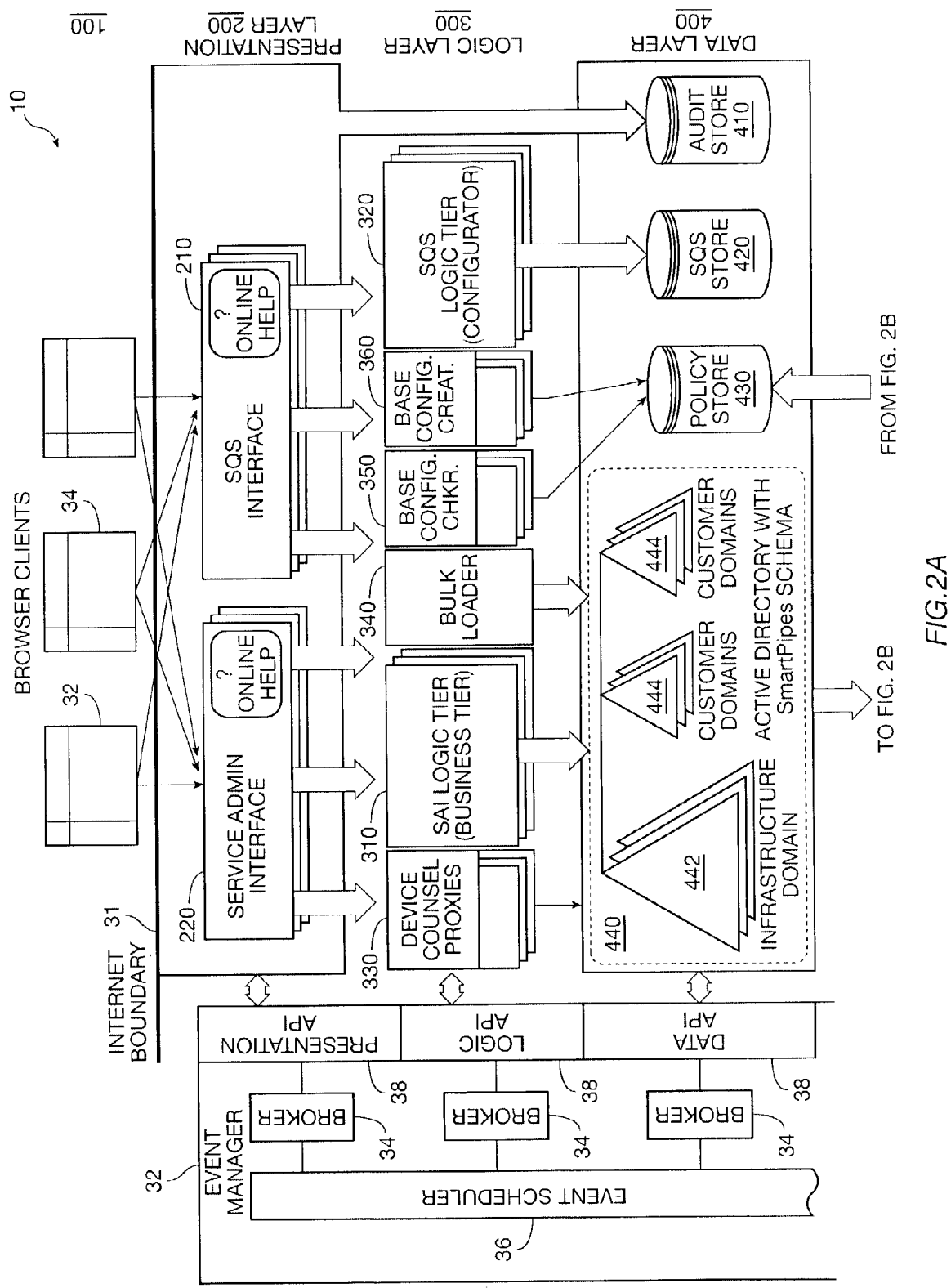
FIGS. 2A and 2B show various layers of the policy-based network management system of FIG. 1.
Figure 2B:
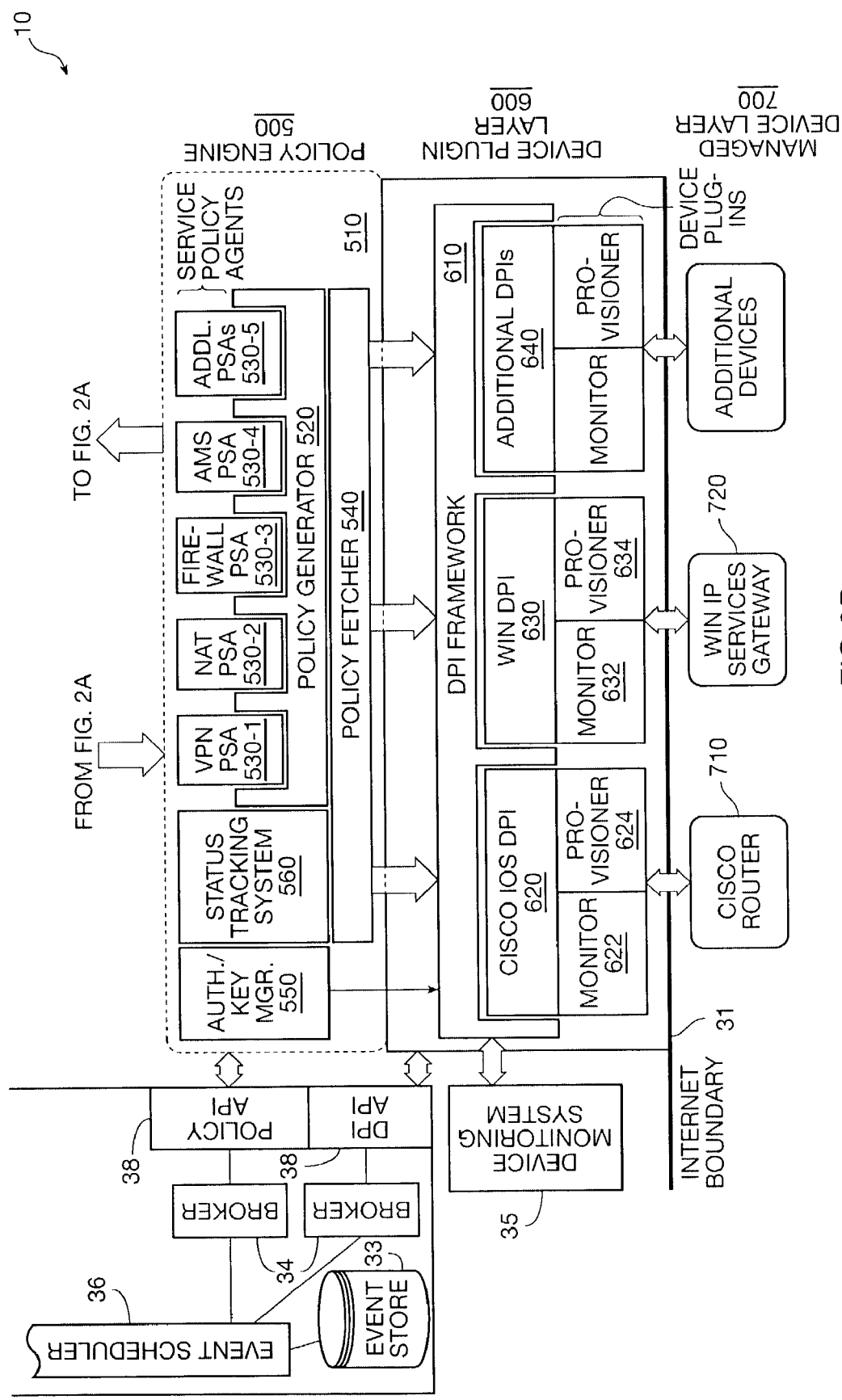

FIGS. 2A and 2B show simplified block diagrams of various layers of management system 10 of FIGS. 1A–1F, in accordance with one embodiment of the present invention. System 10 operates in accordance with a global policy service architecture and includes seven layers, namely, a client layer 100, a presentation layer 200, a logic layer 300, a data layer 400, a policy layer 500, a device plug-in layer 600 and a managed devices layer 700. System 10, also includes, among other modules, an event manager 32 and a device monitoring system 35. System 10 configures, monitors, and controls (i.e., manages) network devices, such as Cisco router 710 and Windows IP Services Gateway 720— in managed devices layer 700—via the internet 31.

System 10 provides a framework for describing internet protocol (IP) services by adopting network policies and managing the network devices (hereinbelow alternatively referred to as managed devices) in layer 700, in accordance with the adopted policies. System 10 is a data-center-based service architecture composed of an array of interacting software, network, and data store elements. System 10 is a dynamic, multi-layered, distributed architecture, and is secure and expandable.

To configure a network device and select and deploy network policies, a user first supplies information regarding his/her network devices (such as the devices' types, model numbers, IP addresses, base configuration data), as well other administrative information (e.g., a contact person at the user's company) to system 10 in one of the following two ways. The user may identify his/her network devices graphically and via an internet browser from various lists that system 10 displays to the user. System 10 collects the user data so identified and stores them in an XML file. Alternatively, the user may create an XML file containing such network identification data and transport that XML file directly to system 10 via the internet. It is understood that when a communication medium other than the internet is used, the user uses a GUI other than an internet browser and may use a file format other than the XML format. It is also understood that the user may create a file using a format other than the XML and which is directly viewable and transportable over the internet. The XML data identifying network devices—supplied by either of the above two methods—is subsequently converted to hierarchical data and written to an Active Directory™ 440.

Next, using a web browser, the user navigates through various policy lists—displayed to the user by system 10—from which lists the user selects and deploys network policies. The selected policy data are stored in Active Directory™ 440. Next, a policy engine in policy layer 500 retrieves policy data stored hierarchically in the Active Directory™ 440, knits different service-based policies together, converts the knitted policies from hierarchical to flat XML format, and thereafter stores the XML policy data which are service-based and device-neutral in policy store 430. Subsequently, an associated device plug-in residing in device plug-in layer 600 of system 10 receives the XML data—stored in the policy store—via the policy engine, translates the XML data to device-specific configuration data and, thereafter, transfers the device-specific configuration data to its associated network device thereby to configure the device and deploy the policies.

Events for changing policy, initiating policy, deploying policy, etc. are controlled by an event manager 32. The event manager includes an event store 33, an event scheduler 36, a number of brokers 34, and application interfaces 38.

Device Plug-In Framework

Figure 3:
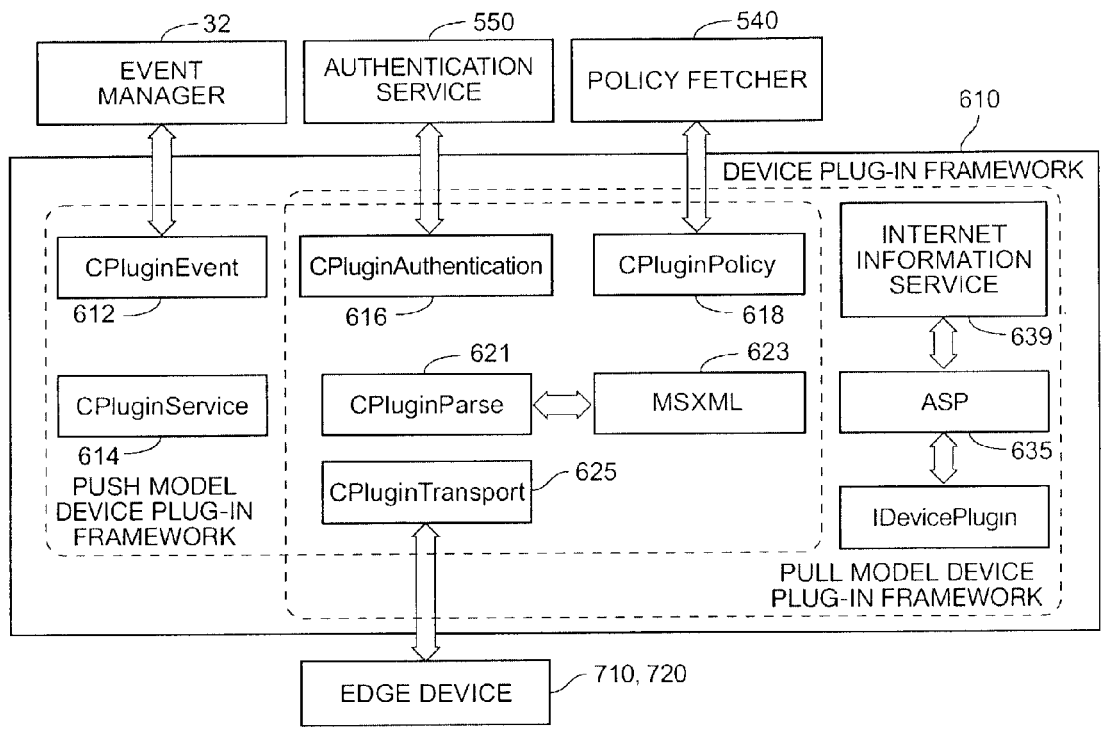
FIG. 3 is a block diagram of the device plug-in framework according to an embodiment of the invention.

FIG. 3 is a block diagram of a device plug-in framework 610 as shown in FIG. 2B. The framework communicates with event manager 32, authentication service 550 and policy fetcher 540. On the other side, it communicates with the edge devices 710 and 720, such as a Cisco Router 710, and a Windows services Gateway 720. The communication to the edge devices is done through the intermediate DPIs, such as the Cisco IOS DPI 620 of FIG. 2B, or the Windows DPI 630. Each of those DPIs includes a monitor and provisioner. For example, the Cisco DPI 620 includes a monitor 622 and a provisioner 624 as shown in FIG. 2B. Similarly, a Windows DPI 630 includes a monitor 632 and a provisioner 634. The monitors monitor events in the edge devices, while the provisioners are responsible for providing the policy and configuration data to be downloaded to the device. The device plug-in framework is designed to provide the common features of all of the different DPIs. Each DPI provides the necessary translation from a device-independent format of the policy to a device specific format.

The device plug-in framework is designed to support basic implementations. A single plug-in supports a push or a pull model for delivering policy to edge devices. The push model is driven by the Event Manager. The plug-in receives an event, fetches the policy, translates it into a format supported by the edge device and then delivers the policy to the edge device. The pull model is driven by the edge device. Edge devices which are not always accessible by the plug-in or need periodic updates will initiate the request for policy. In this case, the event comes from the edge device.

Push Model

In the push model, the plug-in must authenticate itself with the edge device. The means of authentication will be specific to the edge device. Information contained in the event from the event manager will allow the plug-in to request the policy from the Policy Fetcher. In addition to policy, the plug-in may need to request the base configuration for the edge device. Base configurations are kept as an interim solution until all of the information contained in the base configuration is modeled in the directory and supported by the Customer Administration Interface. Base configurations are stored in the Configuration Store 430. Once the policy is retrieved, the plug-in will parse this policy and translate it into a format supported by the edge device. Once this optional parsing is complete, the policy will be transported to the edge device. Push model device plug-ins are implemented as Windows services.

Pull Model

In the pull model, the plug-in waits until the edge device requests policy. Before policy is fetched or transported to the edge device, the plug-in must authenticate the edge device with the Authentication Service. The authentication service will return information necessary to fetch the policy, if the edge device is authenticated. Once the policy is retrieved from the Policy Fetcher, the plug-in may need to parse the policy and translate it into a format supported by the edge device. Once this optional parsing is complete, the policy will be transported to the edge device. Pull model device plug-ins are implemented using ASP and COM.

Referring again to FIG. 3, the left side of the figure illustrates components for a push-model device plug-in, while the right side illustrates components for a pull model device plug-in. The middle portion shows the overlap between the two. A class of COM objects cPlugInEvent corresponds to events from the event manager 32. A COM class 616, entitled CPlugInAuthentication, handles creating and destroying authentication objects, authenticating an edge device using a user name and password or certificate, and returning the unique ID to an edge device after authentication. A class 618, called CPlugInPolicy, is responsible for fetching base configurations from the policy fetcher, returning the version of the configuration in the edge device, fetching policy from the policy fetcher, and returning the version of the policy in the edge device, and similar functions. Object class 620, CPlugInParse, parses policy as needed into separate XML documents 622. A class of objects 624, entitled CPlugInTransport, provides the XML policy to the edge device.

Windows Device Plug-In

Figure 4:
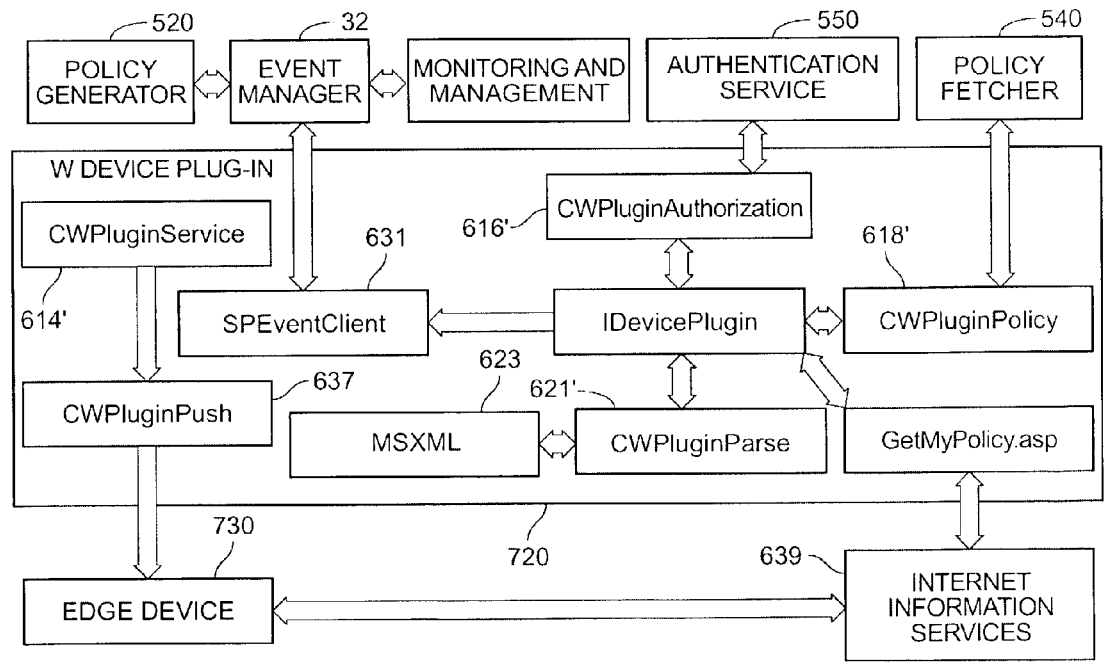
FIG. 4 is a block diagram of a Windows device plug-in according to an embodiment of the invention.

FIG. 4 is a block diagram of a Windows device plug-in. Shown are a series of COM objects created by the object classes of FIG. 3. These COM objects are particularly to a Windows device. The objects correspond to the class description set forth above for FIG. 3. Examples include the authentication object 616', a policy object 618', a plug-in parsing object 620'. Windows DPI 720 of FIG. 4 is implemented with a Windows service. An event client 631 receives events from an event manager 32, and triggers the policy request using class of objects 618'.

The Windows service is implemented as an out-of-process COM server. A server is called by an Application Service Provider (ASP) 635 as shown in FIG. 3. The Windows DPI actually supports both push and pull events, with push events being controlled through an object 637, while pull events are provided through an internet information service 639.

Cisco Router Device Plug-In (CDPI)

Figure 5:
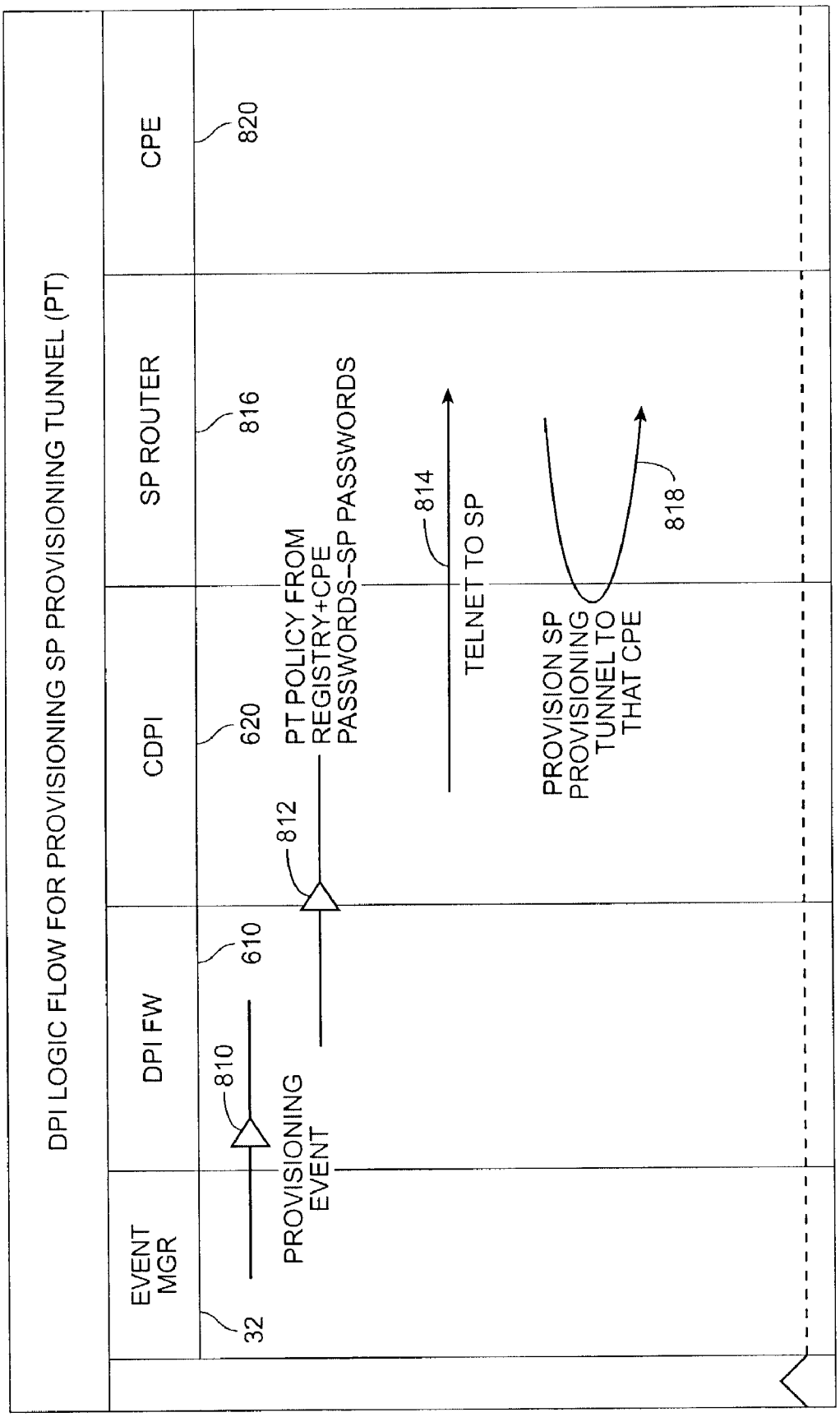
FIG. 5 is a chart illustrating logic data flow for a provisioning tunnel to a device according to an embodiment of the invention.

FIG. 5 illustrates the logic flow for provisioning a network device, in the example shown as a Cisco Router. First, a provisioning event 810 is provided from the event manager 32 to the device plug-in framework 610. Framework 610 obtains provisioning tunnel policy from the registry, along with the CPE passwords and SmartPipes (SP) passwords (812). The Cisco device plug-in (CDPI) 620 then establishes a Telnet 814 to a Smartpipes (SP) Router 816. In addition, a provisioning tunnel 818 is established for communication with the Customer Premises Equipment (CPE) 820.

For the example of a virtual private network (VPN), VPN policy and base configuration are delivered to a CPE through an IPSEC tunnel created by CDPI 620. There are three steps used to create a secured tunnel to send the customer's VPN policy to the CPE. (1) A provisioning tunnel is first configured by clear-text telenetting to the CPE via the Smartpipes provisioning router 816, providing CPE credentials and a key. (2) In a second Telnet, using the secured tunnel that has been set up in the first step, both the CPE credentials and the key are changed. (3) Using the new credentials and new key, the VPN is delivered to the customers CPE.

Figure 6A:
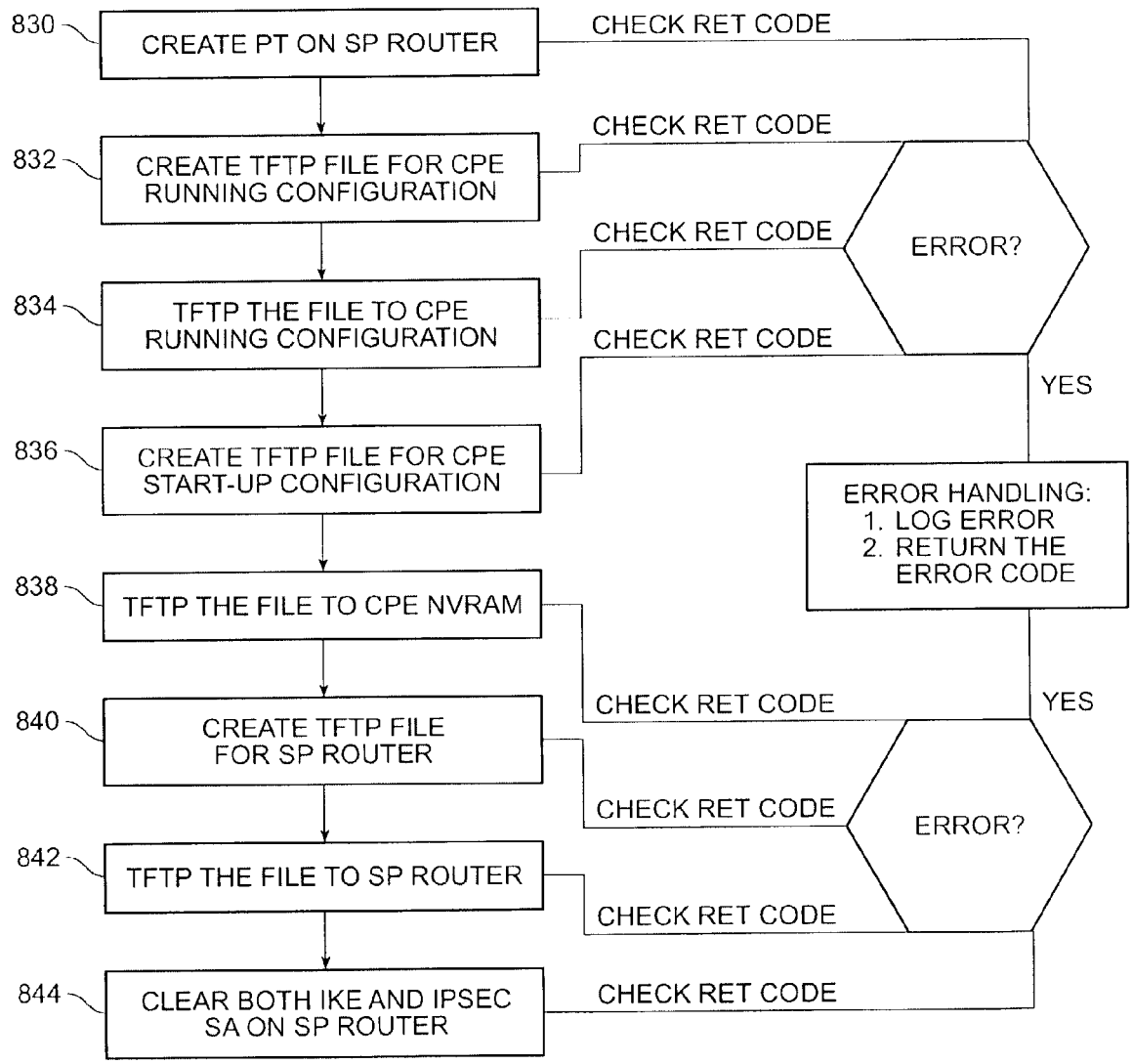
FIGS. 6A–C are flowcharts illustrating the steps for changing passwords, deploying policy, and deploying base configuration on a router according to an embodiment of the present invention.

FIG. 6A illustrates the steps for changing the passwords. First, in a step 830, the provisioning tunnel is created. Second, a Trivial File Transfer Protocol (TFTP) file is created for the CPE running configuration (832). The file is then sent to the CPE (834). Next, a start-up configuration file is created (836), and sent to the CPE's Nonvolatile Random Access Memory (NVRAM) in a step 838. A similar file is created (840) for the router used by the device plug-in of the network management system to communicate with the CPE, and sent to that router (842). Finally, both the internet key exchange (IKE) and internet protocol security (IPSEC) security association (SA) are cleared on the router attached to the DPI (844). The SA includes a security parameter index (SPI), IP destination address and security protocol (AH or ESP).

Figure 6B:
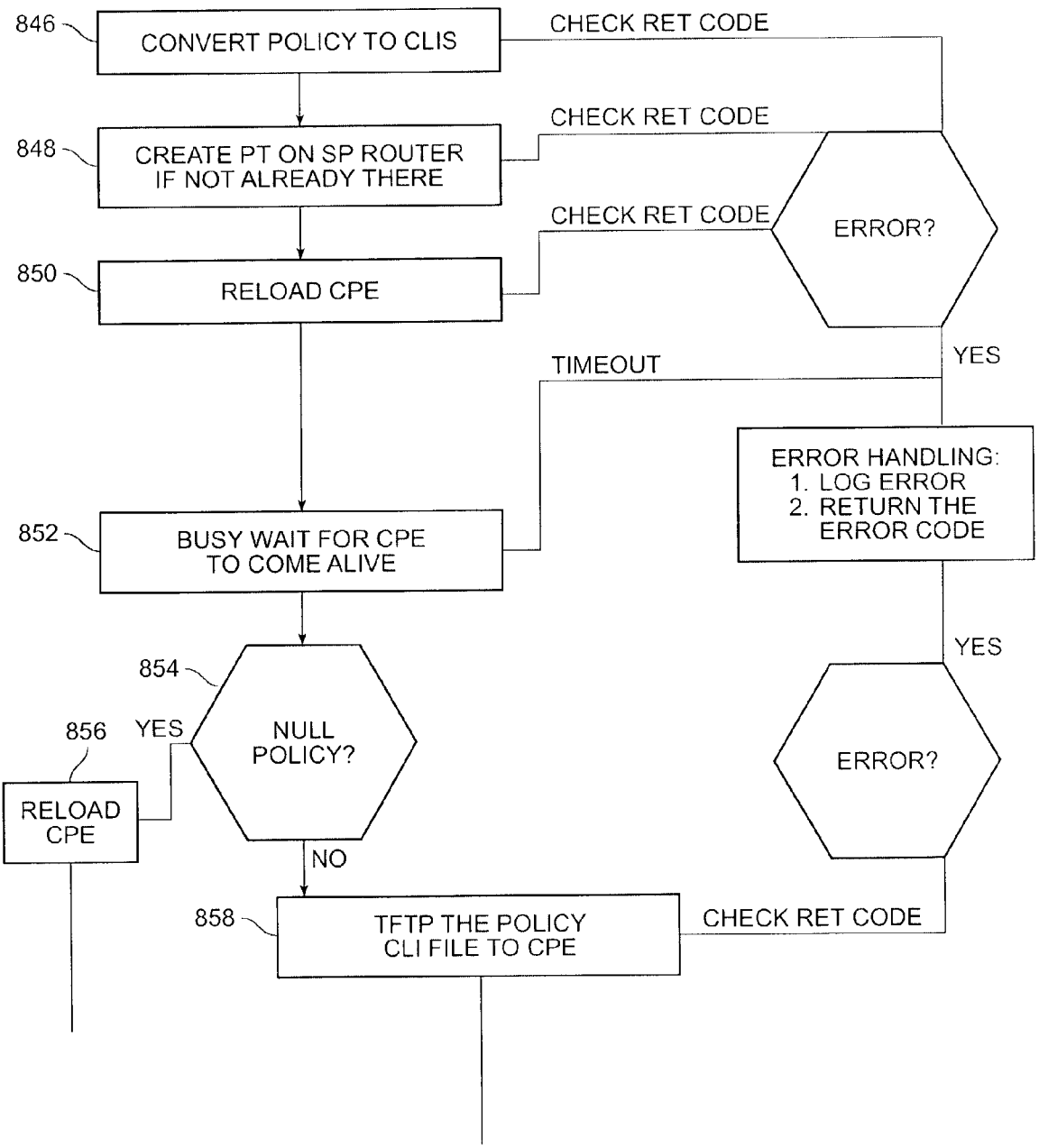

FIG. 6B illustrates the deploying of policy onto a router. In a first step 846, the policy is converted to Command Level Interfaces (CLIs). Next, a provisioning tunnel is created on the router (848), and the CPE is reloaded (850). If there is a busy, the system waits for the CPE to come alive (852). If there is a null policy (854) CPE is reloaded (856). Otherwise, the policy CLI is sent to the CPE using TFTP (858).

Figure 6C:
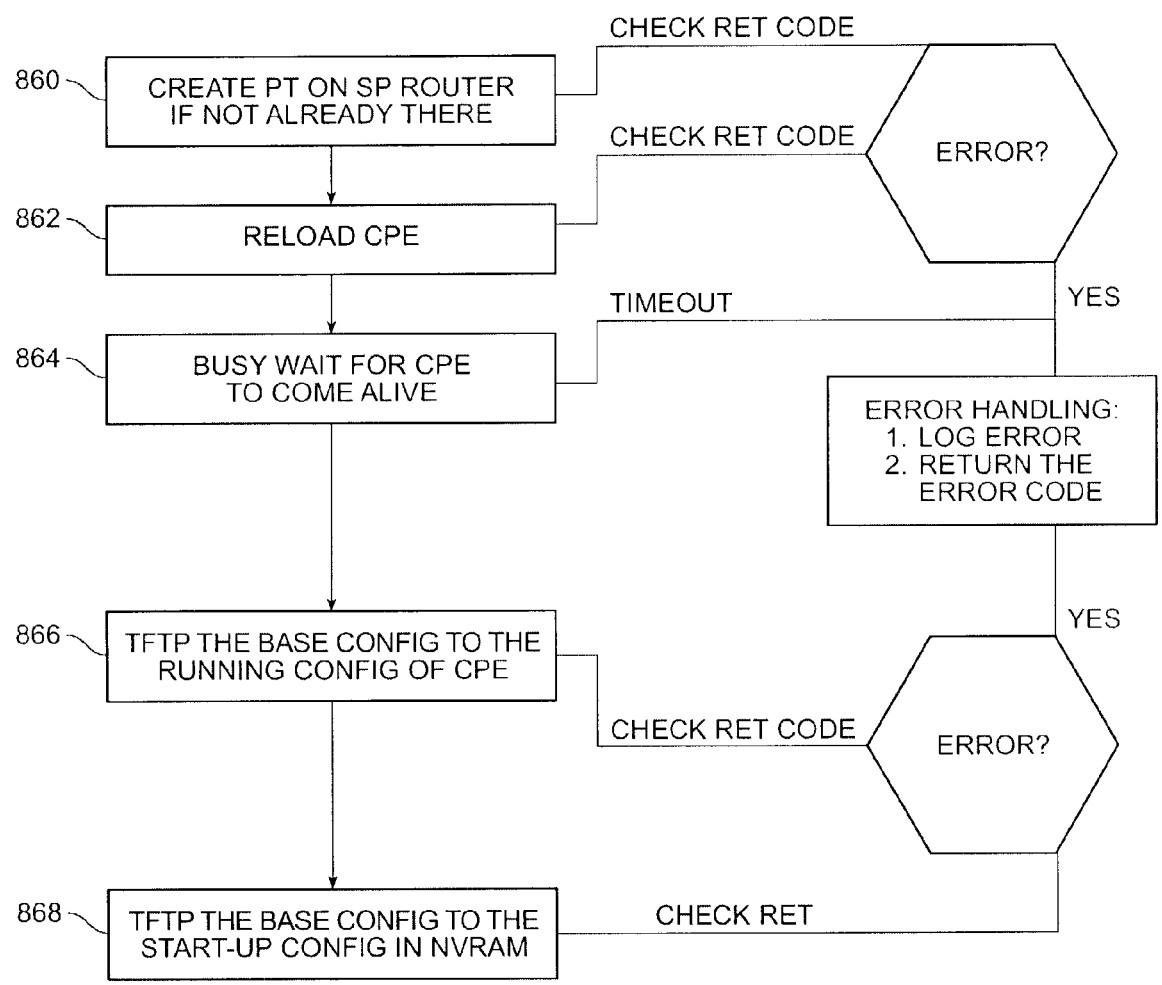

FIG. 6C is a flowchart illustrating deployment of base policy. First, a provisioning tunnel is created (860). CPE is reloaded (862), and if there is a busy, the system will wait for CPE to come alive (864). The base configuration for the running configuration of the CPE is then sent to the CPE (866), followed by the sending of the start-up configuration to the CPE router's NVRAM (868).

Device Simulator

Figure 7A:
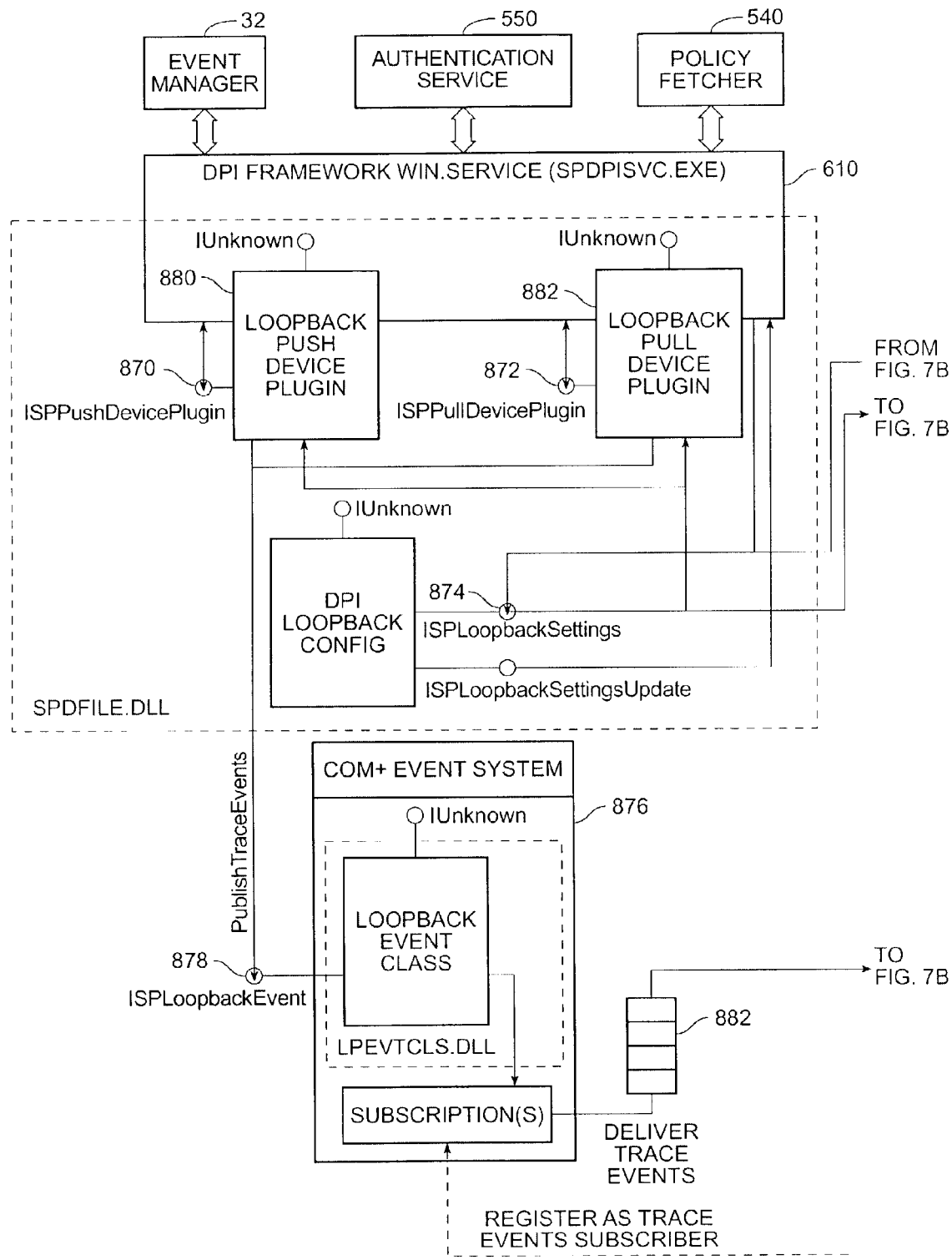
FIGS. 7A and 7B are block diagrams of a device simulator according to an embodiment of the invention.
Figure 7B:
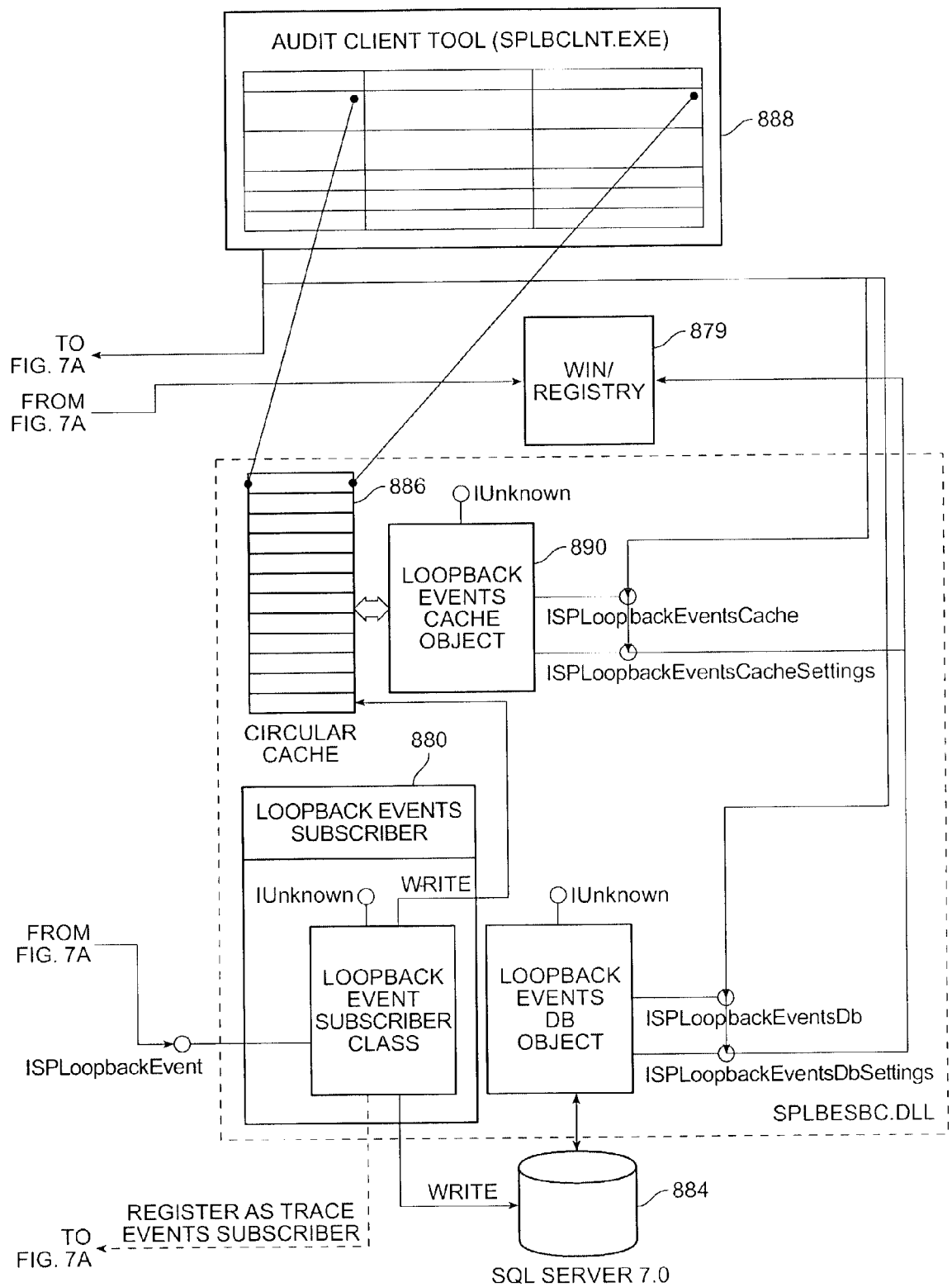

FIGS. 7A and 7B are block diagrams illustrating a device simulator which simulates the command interface for the network management system of FIGS. 2A and 2B. A COM interface 870 for simulating the push device and a COM interface 872 for simulating a pull device connect to the DPI framework 610. The DPI framework in turn connects to event manager 32, authentication service 550, and policy fetcher 540. Another COM interface 874 is used for providing the settings of the simulator. A COM+ event system 876 is used to simulate the events of a CPE, such as a router or a Windows operating system. Event system 876 interfaces through a COM interface 878 to COM objects 880 and 882, which simulate the push device and pull device plug-ins respectively. COM interface 878 acts as the publisher for the COM+ event system, while the subscriber is a loopback event subscriber 880, which is connected through a queue 882 of events. An SQL server 884 is used to store events, with a circular cache 886 providing the most recent events from store 884. A user viewable audit client tool 888 creates a calm object 890 for viewing the circular cache when it is activated.

Loopback Plug-In Layer

The loopback plug-in layer is designed to utilize the services of the existing DPI Framework infrastructure. The basic implementation of the framework is provided as a Windows Service with each device plug-in being an instantiation of the framework. In accordance with the framework design, loopback plug-ins are provided for both the push and the pull model to simulate the functionality of the existing device plug-ins.

Push model simulation is provided by the SPLoopbackPushPlugIn coclass implementing the ISPPushDevicePlugIn interface, while the pull functionality is factored into the SPLoopbackPullPlugIn coclass implementing the ISPPullDevicePlugIn interface. The method calls on these interfaces loop back to the DPI Framework after a configurable delay based on the request type.

Configuration parameters for this layer are set via the SPLoopbackConfiguration coclass. It is a singleton object whose lifetime is maintained by the DPI Framework service. It implements the ISPLoopbackSettings COM interfaces to achieve the desired functionality. This interface is used in the write mode by an audit client tool to set configuration properties (max no of threads, event Request-Response delays and failure percentage) of the loopback layer into the Windows Registry (879). In the read mode it is used by the DPI Framework Service and the device plug-ins to fetch the configuration values. Dynamic changes in configurations settings to the DPI Framework service are achieved through the outgoing ISPLoopbackSettingsUpdate interface. The service gets configuration change notifications via this interface when changes are made by the audit client tool. New values are then fetched via the ISPLoopbackSettings interface. The service thus need not be started and stopped for the settings to take effect.

Event Reporting System

The Event Reporting System is designed to utilize the publisher/subscriber model of COM+. Based on this model the loopback layer publishes trace events without the knowledge of where to report them. The loopback subscriber subscribing to these events has no knowledge of the publishing layer in order to receive and monitor events from it. This leads to a loosely coupled design of subsystems implementation where events are the only connecting force between them. To make the loopback layer publisher and loopback events subscriber time independent, queued components will be used. Queued components allow the publisher trace events to be queued and later replayed to the subscriber.

The connection between the publisher and the subscriber is represented by the SPLoopbackEvent coclass. This COM class implements the ISPLoopbackEvent interface. This interface is called by the loopback publishing layer to fire events and implemented by the loopback events subscriber to receive events. The subscriber is implemented in the SPLoopbackEventsSubscriber coclass. The subscriber registers a subscription for the ISPLoopbackEvent interface with the COM+ Event Service to receive event notifications.

The ISPLoopbackEvent interface implements the Report method. The SPLoopbackEventsSubscriber's implementation of this method writes the event details to the LoopbackEvent table of a SQL Server 7.0 database (884). The Report method also writes event details to an internal circular cache (886), if it has been instantiated by the SPLoopbackEventsCache COM object.

The circular cache is an internal memory store of the most recent trace events that have been received by the loopback events subscriber. The external interface to this cache is through the ISPLoopbackEventsCache interface implemented by the SPLoopbackEventsCache coclass. The queue and its controlling COM class are independent of the subscriber event-receiving mechanism, in that it may or may not be present in memory when events are being received by the SPLoopbackEventsSubscriber coclass. The SPLoopbackEventsCache COM class is instantiated by the audit client when it starts monitoring the DPI loopback system. The client interacts with the ISPLoopbackEventsCache interface to fetch events for display to the user.

The loopback events cache provides status information of the DPI loopback system limited to the current size of the queue. For events prior to those in the queue, the user has to fetch them from the LoopbackEvent table of the SQL Server 7.0 database. The SPLoopbackEventsDb coclass provides the ISPLoopbackEventsDb interface for this purpose.

Audit Client Application

The audit or the loopback events tracing client is an MFC SDI (Microsoft Foundation Class—Simple Document Interface) application that allows the user to view trace events generated in the loopback layer. These events are displayed in a list view in the mainframe window of the application after fetching them from the circular buffer cache via the SPLoopbackEventsCache COM object. The audit client creates this COM object when it starts up and destroys it when it exits. In effect is it easier to think of the list view as being a window into the circular cache. For trace events not stored in the cache, the audit client fetches them from the LoopbackEvent table of the SQL Server 7.0 database by interacting with the SPLoopbackEventsDB COM object.

The other main functionality of the tracing client is to set configuration properties for the loopback plug-in layer of the system. These properties (max no of threads, response times, failure percentage) are set by calling the appropriate set methods of the SPLoopbackConfiguration::ISPLoopbackConfiguration interface.

SPLoopbackPushPlugin

The SPLoopbackPushPlugin coclass implements a push device plug-in for the DPI loopback mechanism. It implements the ISPPushDevicePlugIn interface to provide this functionality. The methods of this interface do not call into the edge device, instead it loops back to the DPI Framework layer after a configurable user delay. Each of the methods of this interface roughly does some or all of the following:

Fetch configuration values for the event Request-Response delays and failure percentage from the ISPLoopbackSettings interface of the LoopbackConfiguration COM object.

Generate COM+ events for . . .

Trace Level1: Error Messages.

Trace Level2: Basic Data Flow Messages. For example: ReceivedRouterPasswordChange Event, Retrieving Current Key from Authentication Key Manager, etc.

Trace Level3: Some Detail Data Messages. For example: Device GUID, Current Enable Password, Provisioning Tunnel Information etc.

Trace Level 4: More Detail Data Messages. For example: Base Configuration, XML Policy, etc.

Interact with the ISPPushDPICallback interface.

Sit in a tight loop for the amount of time specified according to the Request-Response parameter and return back to the caller.

SPLoopbackPullPlugin

The SPLoopbackPullPlugin coclass implements a pull device plug-in for the DPI loopback mechanism. It implements the ISPPullDevicePlugIn interface to provide this functionality. The methods of this interface do not talk to the edge device, instead it loops back to the DPI Framework layer after a configurable user delay. Each of the methods of this interface roughly does some or all of the following:

Fetch configuration values for event Request-Response delay and failure percentage for from the ISPLoopbackSettings interface of the LoopbackConfiguration COM object.

Generate COM+ events for . . .

Trace Level1: Error Messages.

Trace Level2: Basic Data Flow Messages. For example: ReceivedRouterPasswordChange Event, Retrieving Current Key from Authentication Key Manager, etc.

Trace Level3: Some Detail Data Messages. For example: Device GUID, Current Enable Password, Provisioning Tunnel Information etc.

Trace Level 4: More Detail Data Messages. For example: Base Configuration, XML Policy, etc.

Interact with the ISPPullDPIRequest interface. In the real world calls into this interface come from the ASP/IIS layer. We however simulate this behavior by making the method calls ourselves.

Sit in a tight loop for the amount of time specified according to the Request-Response parameter and return back to the caller.

SPLoopbackConfiguration Coclass

SPLoopbackConfiguration coclass is singleton COM object whose lifetime is maintained by the DPI Framework service. It implements the ISPLoopbackSettings interface to set configuration parameters into the Windows registry when asked to by the user via the audit client application. The other interface that it implements is ISPLoopbackSettingsUpdate. This is an outgoing interface whose method fires when an update to the ISPLoopbackSettings properties occurs. The SPLoopbackConfiguration COM class fires this event when the property update occurs.

SPLoopbackEvent Coclass

SPLoopbackEvent is the published component that allows the DPI loopback layer to fire events. It is contained within the COM+ Event system and the ISPLoopbackEvent::Report method that is fired is intercepted by COM+ and sent to the loopback events subscriber. COM+ gains knowledge of this class when it is registered using the COM+ Administrative interfaces. The object itself does not contain much code, only the coclass implementation, COM+ provides the needed implementation to support subscriptions, firing, etc.

SPLoopbackEventsSubscriber Coclass

SPLoopbackEventsSubscriber is the COM class that accepts trace event subscriptions fired from the DPI loopback layer. It implements the same ISPLoopbackEvent interface that the SPLoopbackEvent class supports for the publisher to fire events. When the subscribed trace event is received, the COM+ Event system calls the Report method of the interface. The implementation of this method then writes the received event information to the LoopbackEvent table of the SQL Server 7.0 database. Also, if the SPLoopbackEventsCache COM object and its associated circular cache has been instantiated by the audit client, the implementation of this method writes event information into it.

SPLoopbackEventsCache Coclass

The SPLoopbackEventsCache coclass allows the audit client to access the contents of the circular buffer cache via the ISPLoopbackEventsCache interface. The client uses the GetEvent method to extract the top most event from the cache. The size of the cache is configurable via the Size property.

Internally the buffer cache is implemented as a circular queue that wraps around when loopback events are inserted into it. Newer items are added to the 'rear' and older item are removed from the 'front' of the queue. The queue is empty when 'rear==front' and full when 'NextPos(rear)==front'.

SPLoopbackEventsDb Coclass

The audit client uses the SPLoopbackEventsDb coclass to fetch event records from the data store. This COM object is typically used under the following circumstances:

To fetch older trace events or those which are not present in the circular buffer cache.

To allow offline analysis by the audit client application when the loopback layer service is not running.

The coclass provides the ISPLoopbackEventsDb interface and its contained methods to fetch event records out of the database. Internally SPLoopbackEvents uses ADO to communicate with the SQL Server 7.0 database.

As will be understood by those whose skill in the art, the present invention may be embodied in other specific forms without departing from the essential characteristics thereof. Accordingly, the foregoing description is intended to be illustrative, but not limiting, of the scope of the invention which is set forth in the following claims.

Directory 440 is a single directory containing multiple domain trees of two types, namely an infrastructure domain type 442 and a customer domain type 444. Infrastructure-type domain 442 store non-company specific data such as customer profiles, billing information, standard intranet applications, managed device types and models, standard policy rule sets, standard VPN security templates, supported software versions.

Customer-type domains 444 store company-specific data such as company authentication realms, network users of the company, service groups, managed devices, custom applications, network interfaces, telecommuters and groups, business networking policies, policy conditions, custom VPN security templates, custom policy actions, pointers to managed device base configurations stored in the policy store 430. Hierarchical Data stored in the directory 440 is retrieved and converted to device-neutral XML service-based data by policy engine 510 and is subsequently stored in policy store 430.

What is claimed is:

1. A method for remotely configuring a customer network device from a service center computer, comprising:
   receiving a network policy description from a first customer at the service center computer, the service center computer configured to receive network policy descriptions from at least the first customer and a second customer;
   identifying a network device of the first customer to configure according to the network policy description, the network device being part of a first customer network that is independent of network devices of a second customer network;
   downloading a bootstrap partial configuration from the service center computer to the network device over a public network, the bootstrap partial configuration enabling establishment of a secure channel according to a capability of the network device;
   establishing a secure channel between the service center computer and the network device over said public network said bootstrap partial configuration; and
   downloading full configuration data to said network device using the secure channel.

2. The method of claim 1 wherein said network device is a router, and said establishing a secure channel comprises clear-text telenetting.

3. The method of claim 1 further comprising:
   changing credentials ad a key of said network device after downloading said bootstrap partial configuration.

4. The method of claim 3 wherein said full configuration data is a virtual private network (VPN) policy, which is downloaded after said credentials and key are changed.

5. The method of claim 1 wherein said downloading uses a trivial file transfer protocol (TFTP).

6. The method of claim 1 further comprising:
   generating configuration data for the network device using a device plug-in, the device plug-in being selected from a plurality of device plug-ins according to the type of network device.

7. A method of configuring a customer network device from a service center computer, comprising:
   generating an event at the service center computer responsive to a change of policy for a first customer network;
   retrieving information about the first customer from a storage area of the service center computer, the storage area containing information about a plurality of customers and the networks of said plurality of customers;
   selecting a device plug-in for configuring a network device of the first customer network according to the changed policy, the device plug-in being selected according to the type of the network device;
   establishing a communication channel between the service center computer and the network device over a public network;
   downloading a bootstrap partial configuration from the service center computer to the network device;
   using the bootstrap partial configuration to form a secure channel between the service center computer and the network device; and
   sending full configuration data from the service center computer to the network device using the secure channel.

8. The method of claim 7 further comprising:
   authenticating the service center computer to the network device by providing credentials to the network device.

9. The method of claim 7 further comprising: initiating a change of passwords at the network device.

10. The method of claim 7 wherein the network device is a router and the full configuration data includes a virtual private network (VPN) policy.

11. The method of claim 7 wherein the communication channel between the service center computer and the network device comprises an IPSec tunnel.

12. A method of configuring as customer network device from a service center computer, comprising:
   detecting a change in policy associated with a first customer network at the service center computer;
   retrieving information about the first customer from a storage area of the service center computer, the storage area containing information about a plurality of customers and the networks of said plurality of customers;
   identifying a network device of the first customer to configure using information retrieved from the storage area, the network device being part of a first customer network that is independent of network devices of a second customer network;
   establishing a communication channel over a public network for sending configuration data from the service center computer to the network device;
   downloading a bootstrap partial configuration from the service center computer to the network device over the public network;
   using the bootstrap partial configuration to form a secure channel between the service center computer and the network device; and
   sending full configuration data from the service center computer to the network device using the secure channel.

13. The method of claim 12 further comprising:
   generating an event at the service center computer responsive to the change in policy.

14. The method of claim 13, wherein the event contains information for retrieving information about the first customer from the storage area.

15. The method of claim 12 further comprising:
   authenticating the service center computer to the network device by providing credentials to the network device.

16. The method of claim 12 further comprising:
   generating configuration data for the network device using a device plug-in, the device plug-in being selected from a plurality of device plug-ins according to the type of network device.

17. The method of claim 12 further comprising: initiating a change of passwords at the network device.

18. The method of claim 12 wherein the network device is a router and the full configuration data is a virtual private network (VPN) policy.

* * * * *